US008684126B2

(12) United States Patent
Fujiwara (10) Patent No.: US 8,684,126 B2
(45) Date of Patent: Apr. 1, 2014

(54) REARWARD PEDAL MOVEMENT RESTRAINT ASSEMBLY FOR VEHICLE (75) Inventor: Yusuke Fujiwara, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/876,023

(22) PCT Filed: Sep. 28, 2011

(86) PCT No.: PCT/IB2011/002256
§ 371 (c)(1),
(2), (4) Date: Mar. 26, 2013

(87) PCT Pub. No.: WO2012/042350
PCT Pub. Date: Apr. 5, 2012

(65) Prior Publication Data
US 2013/0186230 A1 Jul. 25, 2013

(30) Foreign Application Priority Data

Sep. 30, 2010 (JP) .................................. 2010-221753

(51) Int. Cl.
B60R 21/09 (2006.01)
G05G 1/32 (2008.04)
B60T 7/06 (2006.01)
(52) U.S. Cl.
CPC .................. B60T 7/065 (2013.01); B60R 21/09 (2013.01); G05G 1/32 (2013.01)
USPC .............. 180/274; 74/560; 280/748; 280/752

(58) Field of Classification Search
CPC ........... B60T 7/065; B60T 7/06; B60R 21/09; B60R 21/045; G05G 1/32
USPC ............. 180/232, 274; 74/560; 280/748, 784, 280/730.1, 751, 752
See application file for complete search history.

(56) References Cited

U.S. PATENT DOCUMENTS

| 6,070,488 | A | * | 6/2000 | Yabusaki et al. | 74/512 |
| 6,178,846 | B1 | * | 1/2001 | Specht et al. | 74/512 |
| 6,276,483 | B1 | * | 8/2001 | Sinnhuber et al. | 180/274 |
| 6,336,176 | B1 | * | 1/2002 | Leyda et al. | 711/170 |
| 6,655,489 | B2 | * | 12/2003 | Kawai et al. | 180/274 |
| 7,185,917 | B2 | * | 3/2007 | Nagata et al. | 280/748 |
| 7,290,787 | B2 | * | 11/2007 | Hayakawa | 280/728.2 |
| 7,497,144 | B2 | * | 3/2009 | Yoon | 74/512 |
| 7,987,743 | B2 | * | 8/2011 | Sukonthapanich | 74/512 |
| 2004/0040409 | A1 | | 3/2004 | Nebuya et al. | |
| 2005/0275204 | A1 | | 12/2005 | Noh | |

(Continued)

FOREIGN PATENT DOCUMENTS

DE 10 2005 000 810 A1 1/2006
EP 0 757 946 A2 2/1997

(Continued)

Primary Examiner — James English
(74) Attorney, Agent, or Firm — Oliff PLC (57) ABSTRACT In a rearward pedal movement restraint assembly for a vehicle, an intermediate portion of a clutch pedal, which moves rearward by the impact of a frontal collision of the vehicle when the frontal collision occurs, contacts a forward portion of a knee panel so that the clutch pedal pivots toward the front of the vehicle so that the amount of rearward movement of the clutch pedal is reduced.

5 Claims, 8 Drawing Sheets

(56) References Cited

U.S. PATENT DOCUMENTS

| | | |
|---|---|---|
| 2006/0055163 A1 | 3/2006 | Cho |
| 2007/0137915 A1 | 6/2007 | Sanagi et al. |
| 2007/0222197 A1* | 9/2007 | Makita et al. ............ 280/752 |
| 2013/0249201 A1* | 9/2013 | Fujiwara ............ 280/752 |

FOREIGN PATENT DOCUMENTS

| | | |
|---|---|---|
| EP | 0 847 900 A1 | 6/1998 |
| GB | 2 389 565 A | 12/2003 |
| JP | A-10-226325 | 8/1998 |
| JP | A-2004-017698 | 1/2004 |
| JP | A-2004-98868 | 4/2004 |
| JP | A-2004-98893 | 4/2004 |
| JP | A-2005-343318 | 12/2005 |
| JP | A-2006-008101 | 1/2006 |
| JP | A-2007-84009 | 4/2007 |
| JP | A-2007-131064 | 5/2007 |
| JP | A-2009-003636 | 1/2009 |
| JP | A-2010-140301 | 6/2010 |

* cited by examiner

REARWARD PEDAL MOVEMENT RESTRAINT ASSEMBLY FOR VEHICLE

INCORPORATION BY REFERENCE

The disclosure of Japanese Patent Application No. 2010-221753 filed on Sep. 30, 2011 including the specification, drawings and abstract is incorporated herein by reference in its entirety.

BACKGROUND OF THE INVENTION

1. Field of the Invention

The invention relates to a rearward pedal movement restraint assembly that restrains the rearward movement of a pedal when a frontal collision occurs in a vehicle.

2. Description of Related Art

In a knee airbag device shown in Japanese Patent Application Publication No. 2004-098868 (JP-A-2004-098868), a knee panel, which contacts a brake pedal to stop the rearward movement of the pedal in the event of a collision, is integrally formed in the front end of a knee airbag module.

In a rearward movement prevention structure for a pedal shown in Japanese Patent Application Publication No. 2007-084009 (JP-A-2007-084009), an electric power steering unit is provided with a rearward movement prevention bracket that extends toward the rear face of a clutch pedal, so that if a collision occurs, the rearward movement prevention bracket interferes with the rearward movement of the pedal, and thus the pedal is restrained from moving rearward.

By the way, in recent years, knee airbag modules have been mounted higher to reduce the size and weight of the knee airbag. However, in the knee airbag device of JP-A-2004-098868, because the device is constructed so that rearward movement of the pedal results in contact with an intermediate portion of the knee panel in an up-down direction, the device cannot be applied to vehicles in which the knee airbag module is mounted high in the vehicle.

On the other hand, as for the knee airbag device described in JP-A-2007-084009, because a dedicated rearward movement prevention bracket for stopping the rearward movement of the brake pedal at the time of a collision is needed, the number of component parts increases. Besides, in a vehicle having the body floor portion that is greatly accelerated at the time of a collision, there is a need to reinforce a rearward movement prevention bracket, which results in an increase in cost and mass.

SUMMARY OF THE INVENTION

The invention provides a vehicular rearward pedal movement restraint assembly that may be installed in a vehicle in which the knee airbag module is mounted high, without increasing the number of component parts and cost.

A rearward pedal movement restraint assembly for a vehicle in accordance with a first aspect of the invention includes: a knee panel that protects the knees of a vehicle occupant in the event of a frontal collision of the vehicle, the knee panel being attached to an instrument panel reinforcement that extends in a transverse direction of the vehicle; and a pedal that moves rearward by the impact of the frontal collision when the frontal collision occurs. The rearward movement of the pedal caused by the impact of the frontal collision brings the pedal in contact with a front end portion of the knee panel at an intermediate portion of the pedal that is below a rotation center of the pedal so that the pedal pivots toward the front of the vehicle.

Due to the foregoing construction, the pedal that moves rearward movement of the pedal caused by the impact of the frontal collision pivots toward the front of the vehicle, and therefore the amount of rearward movement of the pedal is reduced. Thus, due to the contact of the front end portion of the knee panel with the pedal, even when the foregoing aspect of the invention is applied to a vehicle in which the mount position of the knee airbag module is high, the amount of rearward movement of the pedal can be reduced by disposing the front end portion of the knee panel substantially at the same height as the intermediate portion of the pedal. Moreover, because the knee panel that protects the knees of the occupant at the time of the frontal collision of the vehicle is also used as a component part that restraint the rearward movement of the pedal, it is possible to avoid increases in the number of component parts and in cost and mass.

The rearward pedal movement restraint assembly may have bracket that attaches the knee pane to the instrument panel reinforcement. In the rearward pedal movement restraint assembly, the bracket may have an upper bracket that is plastically deformable by a load that is transmitted to the knee panel by the knees of the occupant, and a lower bracket that supports a reaction force that is induced by deployment of a knee airbag, and the lower bracket may be fixed to or near the front end portion of the knee panel.

In the foregoing rearward pedal movement restraint assembly, the upper bracket plastically deforms by load that is transmitted to the knee panel by the knees of the occupant. On the other hand, the lower bracket has such a rigidity as to support the reaction force caused by the deployment of the knee airbag. That is, the lower bracket is made less easily deformable than the upper bracket, and the lower bracket is fixed to or near the front end portion of the knee panel (i.e., an end portion thereof that contacts the intermediate portion of the pedal). Therefore, the load transmitted (input) from the intermediate portion of the pedal to the front end portion of the knee panel can be supported by the high-rigidity lower bracket that is less easily deformable, so that rearward movement of the pedal can be effectively restrained.

In the rearward pedal movement restraint assembly in accordance with the first aspect of the invention, the front end portion of the knee panel may be provided with a fastening portion between the knee airbag module and the knee panel.

In the foregoing structure, because the fastening portion between the knee airbag module and the knee panel is provided in the front end portion of the knee panel, the rigidity of the front end portion of the knee panel improves. Therefore, the deformation of the knee panel occurring when the intermediate portion of the pedal contacts the front end portion of the knee panel can be restrained, so that the rearward movement of the pedal can be effectively restrained.

In the rearward pedal movement restraint assembly in accordance with the foregoing aspect of the invention, the front end portion of the knee panel may be curved or inclined toward a middle of a seat in which the occupant sits in a widthwise direction of the seat.

According to the foregoing structure, if the intermediate portion of the pedal moving rearward deviates from the front end portion of the knee panel when the frontal collision of the vehicle occurs and the intermediate portion of the pedal impacts the front end portion of the knee panel, the intermediate portion of the pedal is displaced outward in the seat widthwise direction along a curvature or inclination of the front end portion of the knee panel. Therefore, approach of the pedal to the occupant can be avoided.

In the rearward pedal movement restraint assembly of the foregoing aspect, the knee panel may include a panel body that is attached to the instrument panel reinforcement, and an extension portion that is fixed to a front end portion of the panel body and that extends in the transverse direction of the vehicle, and the intermediate portion of the pedal may be positioned to contact the extension portion when the frontal collision occurs.

In the foregoing structure, the extension portion that extends in the vehicle transverse direction is fixed to the front end portion of the panel body of the knee panel. When the frontal collision occurs, the extension portion contacts the intermediate portion of the pedal. Therefore, the pedal is pivoted toward the front side, and the amount of rearward movement of the pedal is reduced. Thus, because the extension portion is fixed to the front end portion of the panel body, the rearward movement of the pedal can be restrained by the extension portion even in the case where the panel body and the pedal are apart from each in the vehicle transverse direction.

In the rearward pedal movement restraint assembly in accordance with the foregoing aspect, an upper end portion of the pedal may be supported by a pedal bracket that is fixed to a vehicle body, and an extended portion that extends diagonally downward the front of the vehicle may be provided on the front end portion of the knee panel, and a distal end of the extended portion may face, below the pedal bracket, the intermediate portion of the pedal.

Due to this structure, even when the frontal collision of the vehicle occurs, the pedal bracket contacts the front end portion (extended portion) of the knee panel, the contact of the distal end of the extended portion with the intermediate portion of the pedal will restrain the rearward movement of the pedal.

As described above, in the rearward pedal movement restraint assembly of the foregoing aspect of the invention is applicable also to a vehicle in which the mount position of the knee airbag module is high, and is able to avoid increases in the number of component parts and in cost and mass.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, with reference to FIG. 1 to FIG. 6, a rearward pedal movement restraint assembly 10 in accordance with a first embodiment of the invention will be described. In the drawings, the arrow FR shows a vehicle forward direction, and the arrow UP shows a vehicle's upward direction, and the arrow OUT shows a transverse outward direction.

Figure 1:
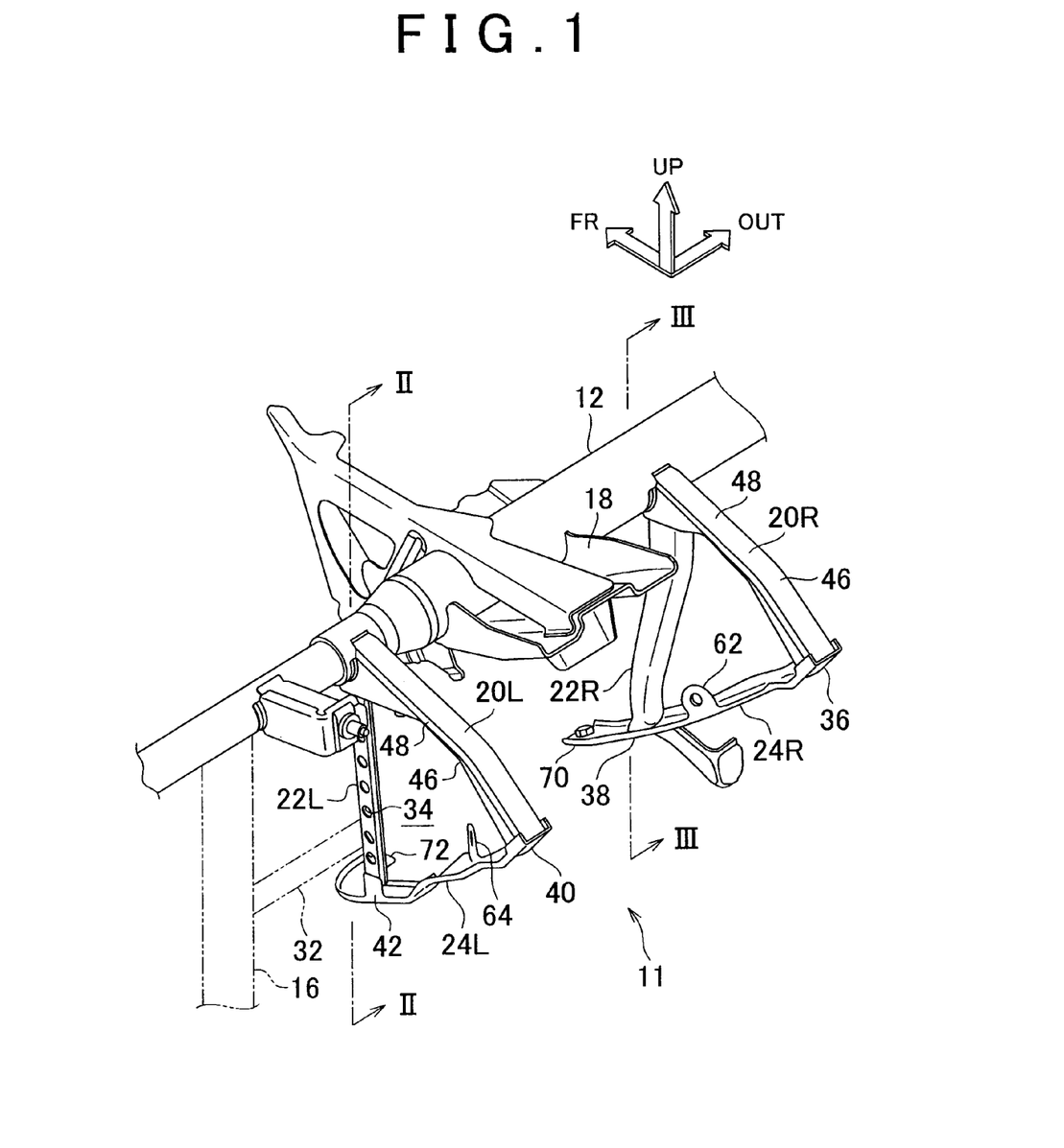
FIG. 1 a perspective view of the structure of a vehicle occupant knee protection device that includes a rearward pedal movement restraint assembly in accordance with a first embodiment of the invention and peripheral members around the occupant knee protection device.
Figure 2:
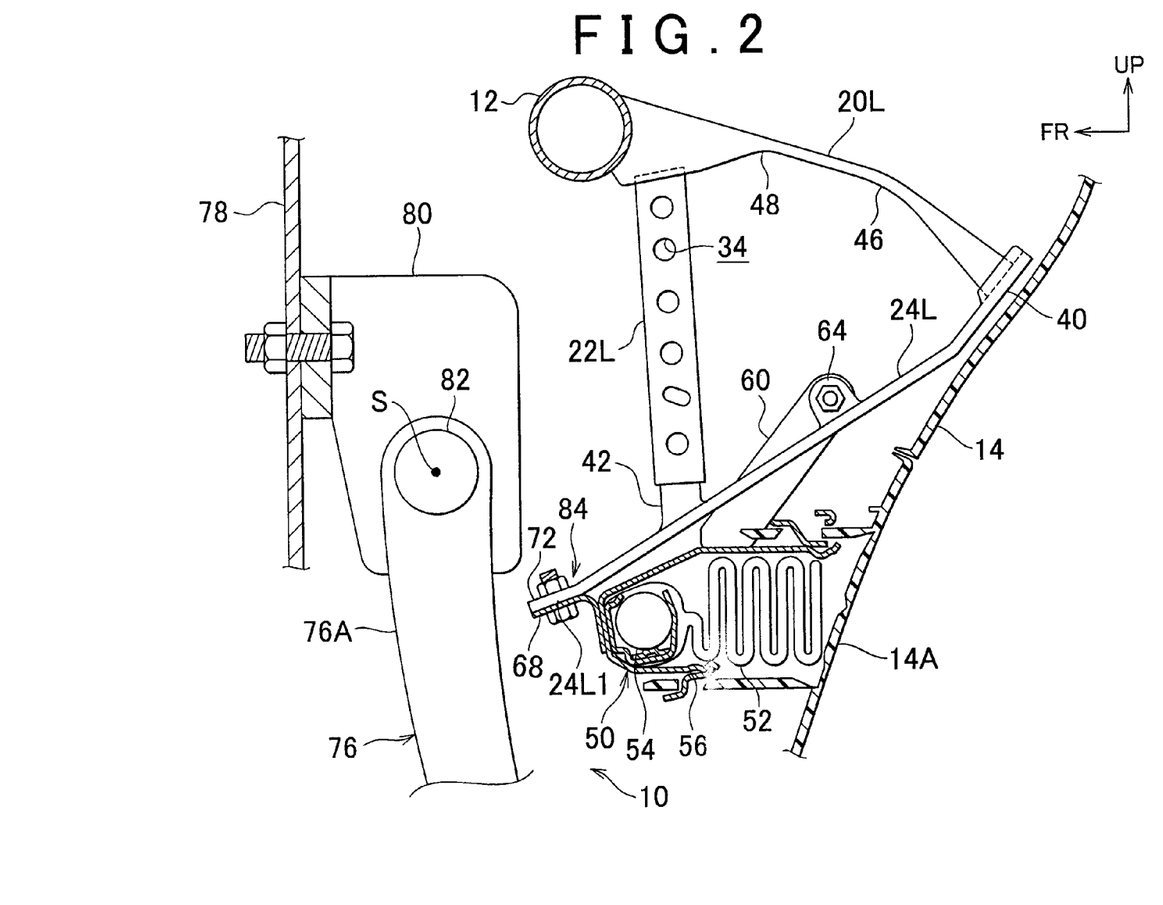
FIG. 2 is an enlarged sectional view showing a cut-off surface taken along line II-II in FIG. 1.
Figure 3:
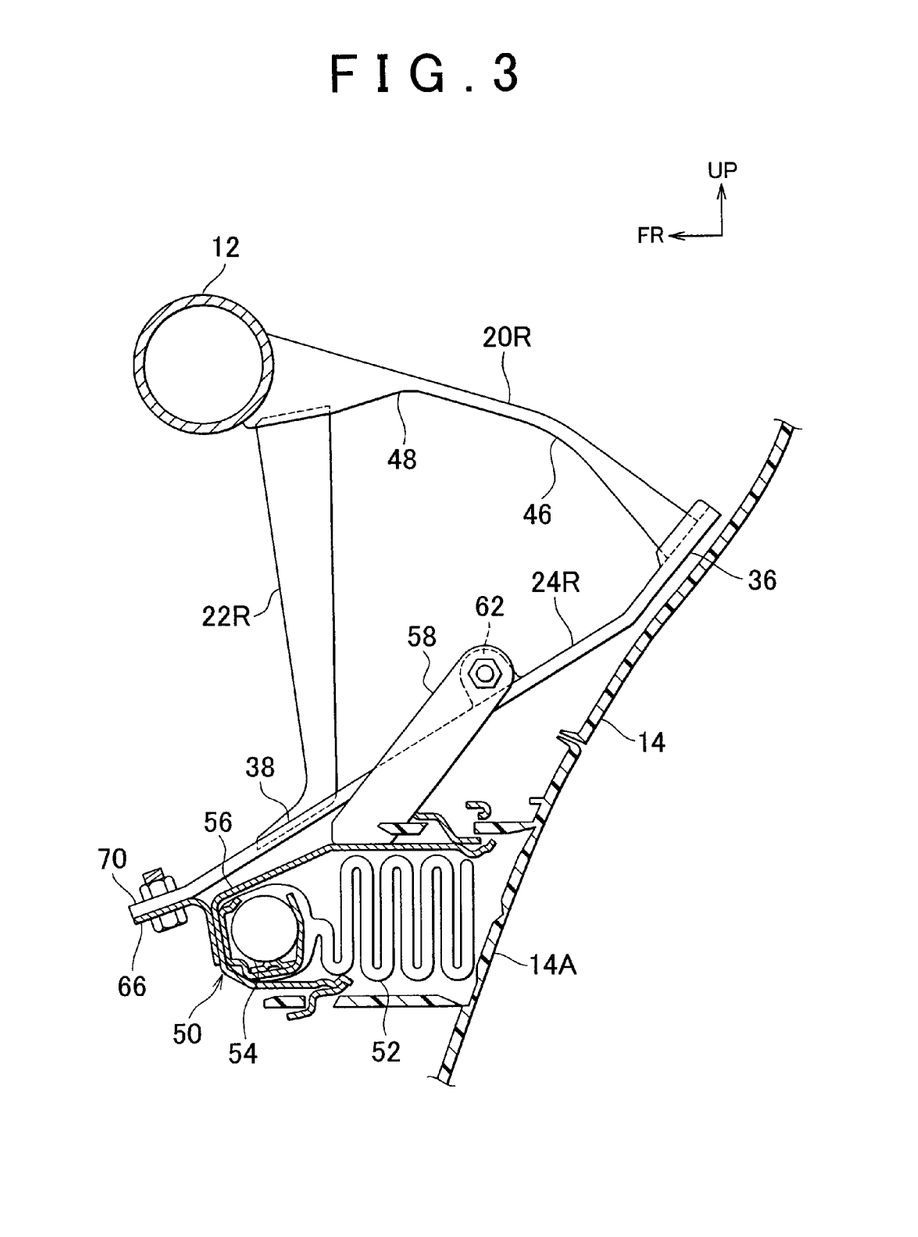
FIG. 3 is an enlarged sectional view showing a cut-off surface taken along line in FIG. 1.

A vehicle occupant knee protection device 11 is equipped with the rearward pedal movement restraint assembly 10 in accordance with the first embodiment. The vehicle occupant knee protection device 11 protects the knees of an occupant seated in the driver's seat of a right-hand-drive vehicle, that is, a vehicle with its steering wheel disposed on the right side. As shown in FIGS. 1 to 3, the vehicle occupant knee protection device 11 is attached to an instrument panel reinforcement 12 as shown in FIGS. 1 and 3. The instrument panel reinforcement 12 is disposed at an inner side of an instrument panel 14 that is provided at the front of the vehicle cabin. The instrument panel reinforcement 12 extends in a vehicle transverse direction, and links left and right vehicle body panels (FIG. 1 shows only a portion of the instrument panel reinforcement 12).

The instrument panel reinforcement 12 is constructed of a elongated metal pipe, and is formed so that the driver's-side portion is thicker than the passenger's-side portion to provide greater strength (i.e., the passenger's-side portion does not need as much strength as the driver's-side portion). The upper end of a floor brace 16 is fixed to the middle portion of the instrument panel reinforcement 12 in a longitudinal direction thereof. The lower end of the floor brace 16 is fixed to a floor panel. In addition, a column bracket 18 that fixes a steering column is attached to a driver's-side portion of the instrument panel reinforcement 12. A pair of left and right upper brackets 20R and 20L, left and right lower brackets 22R and 22L, and left and right knee panels 24R and 24L, which constitute the vehicle occupant knee protection device 11, are disposed on the left and right sides of the column bracket 18, respectively.

The pair of left and right upper brackets 20R and 20L are each formed from an elongated metal plate. The front end of each upper bracket is welded to the instrument panel reinforcement 12, and extends from the instrument panel reinforcement 12 toward the rear of the vehicle. The upper brackets 20R and 20L are formed generally in a letter-U sectional shape that opens downward.

The pair of left and right lower brackets 22R and 22L are each formed from an elongated metal plate, and are disposed below the instrument panel reinforcement 12. The right-side lower bracket 22R is formed from a metal sheet that is thicker than the metal sheet used to form the upper brackets 20R and 20L, and is formed in a generally letter-U sectional shape that opens toward the front of the vehicle and has a higher rigidity than the upper brackets 20R and 20L. An upper end of the lower bracket 22R is fixed to the front end side of the upper bracket 20R (to a position on the upper bracket 20R that is closer to the front end portion than the lower bracket 22R is), and extends downward from the upper bracket 20R.

In contrast, the upper end of the lower bracket 22L, disposed on the left side, may be welded to the front end of the left-side upper bracket 20L, and extends downward from the upper bracket 20L. The lower bracket 22L, as shown in FIG. 1, is linked and fixed to the floor brace 16 via a link bracket 32, and is supported (reinforced) by the floor brace 16. Therefore, although the lower bracket 22L is formed thinner as a whole than the lower bracket 22R and is provided with a plurality of through holes 34 for reducing the weight, the lower bracket 22L is less easily deformed by an impact load in the vehicle longitudinal direction than the upper brackets 20R and 20L. The lower brackets 22R and 22L are sufficiently rigid to support the reaction force induced by the deployment of the knee airbag 52 described below (see FIGS. 2 and 3).

The left and right knee panels 24R and 24L are apart from each other in the transverse direction of the vehicle, each formed from an elongated metal sheet, and have each generally letter-U sectional shape that opens upward. The knee panels 24R and 24L are disposed on the opposite side of the upper brackets 20R and 20L and the lower brackets 22R and 22L from the instrument panel reinforcement 12. With respect to the right-side knee panel 24R, an upper-side fixing portion 36 provided at the upper end of the knee panel 24R is welded to a rear end portion of the upper bracket 20R, and a lower-side fixing portion 38, which is provided at or near the lower end of the knee panel 24R (front end portion thereof), is welded to the lower end of the lower bracket 22R. In contrast, an upper-side fixing portion 40 of the left-side knee panel 24L provided at the upper end of the knee panel 24L is welded to a rear end portion of the upper bracket 20L, and a lower-side fixing portion 42 provided at the lower end (front end) of the knee panel 24L is welded to the lower end of the lower bracket 22L.

The knee panels 24R and 24L are each disposed at a position that faces, from a front side of the vehicle, a knee portion of an occupant seated in the driver's seat. Specifically, if the occupant seated in the driver's seat is of a average body build, or is larger than the average build (e.g., is of a body shape (AM50) that covers 50% of the body builds of the adult males in the United States from the small side), the upper ends (upper-side fixing portions 36 and 40) of the knee panels 24R and 24L face the occupant's knees. In contrast, if the occupant seated in the driver's seat is smaller than the average body build (e.g., is of a body shape (AF05) that covers 5% of the body builds of the adult females in the United States from the small side), the intermediate portions of the knee panels 24R and 24L in the vertical direction face the occupant's knee portion.

In the above-described vehicle occupant knee protection device 11, as shown in FIG. 2 and FIG. 3, a first crease 46 and a second crease 48 (both of which are fragile portions) are provided at an intermediate portion along the length of each of the upper brackets 20R and 20L. The first crease 46 and the second crease 48 are juxtaposed in the longitudinal direction, and the second crease 48 is disposed nearer to the instrument panel reinforcement 12 than the first crease 46 is.

Each height of the upper brackets 20R and 20L (section modulus) is gradually reduced from the knee panels 24R and 24L toward the first crease 46. Likewise, each height of the upper brackets 20R and 20L (section module) are gradually reduced from the instrument panel reinforcement 12 toward the second crease 48. However, each height of the upper brackets 20R and 20L remains constant between the first crease 46 and the second crease 48. Each height of the upper brackets 20R and 20L is each length in the vertical direction of flange portions of the upper brackets 20R and 20L in the each cross-sectional view of the upper brackets 20R and 20L.

Therefore, when a collision of the vehicle occurs, the knees of the seated occupant collides with the knee panels 24R and 24L and thereby an impact load toward the front of the vehicle acts on the rear end portions of the upper brackets 20R and 20L via the knee panels 24R and 24L, stress concentrates to the first crease 46 and the second crease 48. Accordingly, the upper brackets 20R and 20L each bend sharply (plastically deform) at the first crease 46 and the second crease 48.

In the first embodiment, as shown in FIG. 2 and FIG. 3, a knee airbag module 50 (not shown in FIG. 1) may be disposed at the lower bracket 22R and 22L-side portions of the knee panels 24R and 24L (i.e., the lower side of the lower brackets 22R and 22L in this example). The knee airbag module 50 includes a knee airbag 52 that inflates and deploys before the occupant's knees by breaking a lower site 14A in an instrument panel 14, an inflator 54 that supplies gas into the knee airbag 52 at the time of a collision of the vehicle, and a metallic module case 56 that houses the knee airbag 52 and the inflator 54.

Left and right fastening pieces 58 and 60, which extend diagonally upward and rearward relative to the vehicle, are provided at an intermediate portion of the module case 56 in the vehicle longitudinal direction. The right-side fastening piece 58 is fastened by a bolt and a nut to a fastening portion 62 that is provided in an intermediate portion of the right-side knee panel 24R in the vertical or up-down direction (at an intermediate position between a fixing portion 36 and a fixing portion 38). The left-side fastening piece 60 is fastened and fixed by a bolt and a nut to a fastening portion 64 that is provided in an intermediate portion of the left-side knee panel 24L in the vertical or up-down direction (at an intermediate position between a fixing portion 40 and a fixing portion 42).

Left and right fastening pieces 66 and 68 that extend toward the front of the vehicle are provided on a front end portion of the module case 56. The right-side fastening piece 66 is fastened by a bolt and a nut to a fastening portion 70 that is provided at the front end (lower end) of the right-side knee panel 24R. The left-side fastening piece 68 is fastened by a bolt and a nut to a fastening portion 72 that is provided at the front end (lower end) of the left-side knee panel 24L.

Therefore, the knee airbag module 50 is fastened and fixed to the knee panels 24R and 24L at four locations, that is, the fastening portions 62, 64, 70 and 72 that are provided at upper and lower sides of the lower end portions of the lower brackets 22R and 22L. Then, the lower end portion of the right lower bracket 22R is disposed at an intermediate position between the fastening portion 62 and the fastening portion 70, and the lower end portion of the left lower bracket 22L is disposed at an intermediate position between the fastening portion 64 and the fastening portion 72.

In the rearward pedal movement restraint assembly 10 for a vehicle in accordance with this embodiment, a clutch pedal 76 is disposed at the vehicle's front side of the left knee panel 24L as shown in FIG. 2. The upper end of the clutch pedal 76 is linked, via a link shaft 82, to a pedal bracket 80 fixed to a dash panel 78. Therefore, the clutch pedal 76 is rotatable (pivotable) about the link shaft 82. An intermediate portion 76A of the clutch pedal 76 that is below the rotation center S of the pedal faces the front end portion of the knee panel 24L, from the vehicle's front side.

Figure 4:
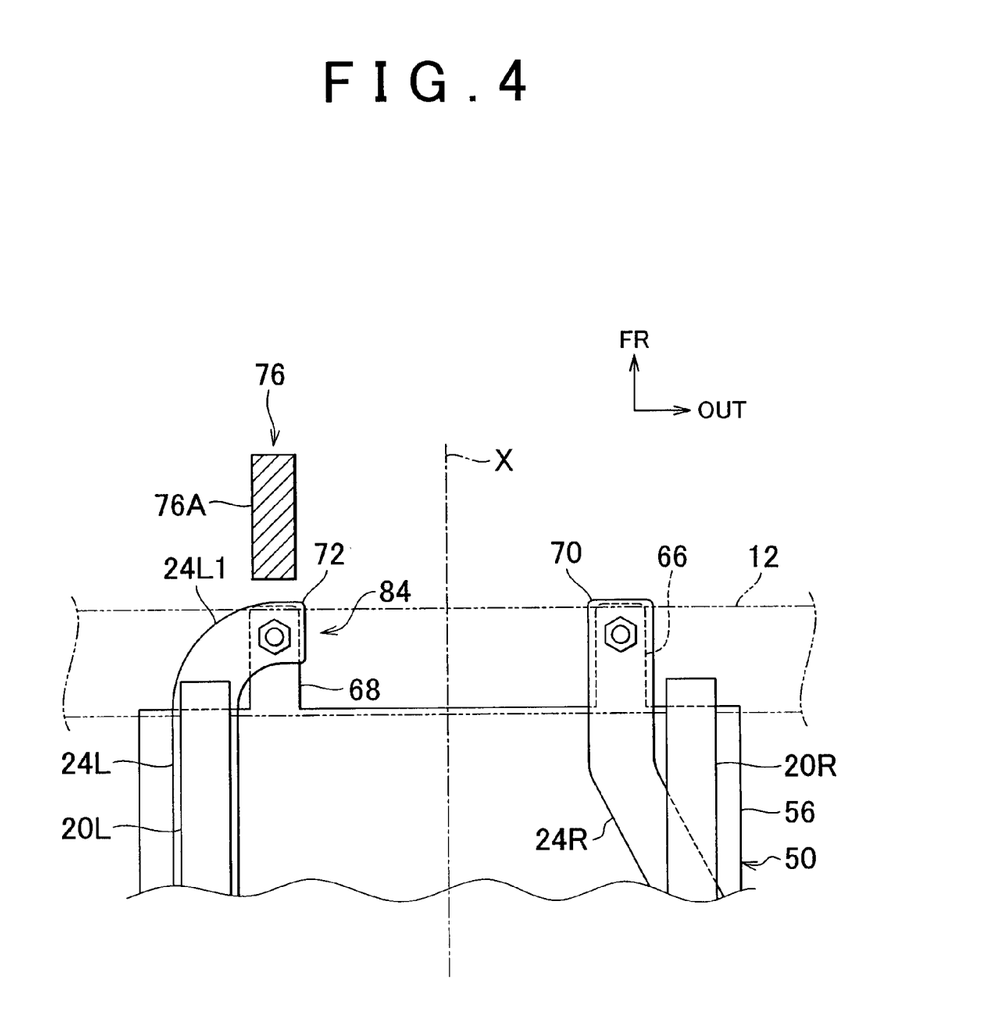
FIG. 4 is a schematic plan view of a portion of the structure shown in FIGS. 2 and 3 which is taken from above the vehicle.

As shown in FIG. 4, the front end of the left knee panel 24L is provided with a curved portion 24L1 that is curved toward an outward vehicle transverse direction, that is, toward a middle of the seat (not shown) in which an occupant sits in the transverse direction. In this embodiment, the curved portion 24L1 has a circular arc shape (round shape). The curved portion 24L1 is formed so as to turn more toward the vehicle transverse direction the nearer it is to the distal end of the curved portion 24L1. The one-dot chain line X shown in FIG. 4 is an imaginary line that extends in the vehicle longitudinal direction through the middle of the aforementioned seat in the widthwise direction thereof.

The distal end of the curved portion 24L1 is provided with a fastening portion 72 of the lower bracket that is fastened and fixed to the fastening piece 68 of the module case 56 (hereinafter, the fastening and fixing portion between the fastening piece 68 and the fastening portion 72 will be referred to as "fastening-fixing portion 84"). The fastening-fixing portion 84 faces the intermediate portion 76A of the clutch pedal 76 from the a rear side of the vehicle, with a predetermined space left therebetween.

Next, operation and effects of the first embodiment will be described.

In the above-described rearward pedal movement restraint assembly 10 for a vehicle, the knee airbag 52 is inflated and deployed toward the occupant's knees when a vehicle collision occurs in order to receive the impact load from the occupant's knees. If the impact load cannot be completely absorbed by the knee airbag 52, when the occupant has is average or has a larger build than average, the upper brackets 20R and 20L sharply bend at the first creases 46 and the second creases 48 to absorb the excess impact load. In addition, if the occupant has a smaller build than average, the excess impact load may be absorbed by deformation of the knee panels 24R and 24L disposed before the occupant's knees. Therefore, the occupant's knees are protected from impact when a vehicle collision occurs.

Figure 5:
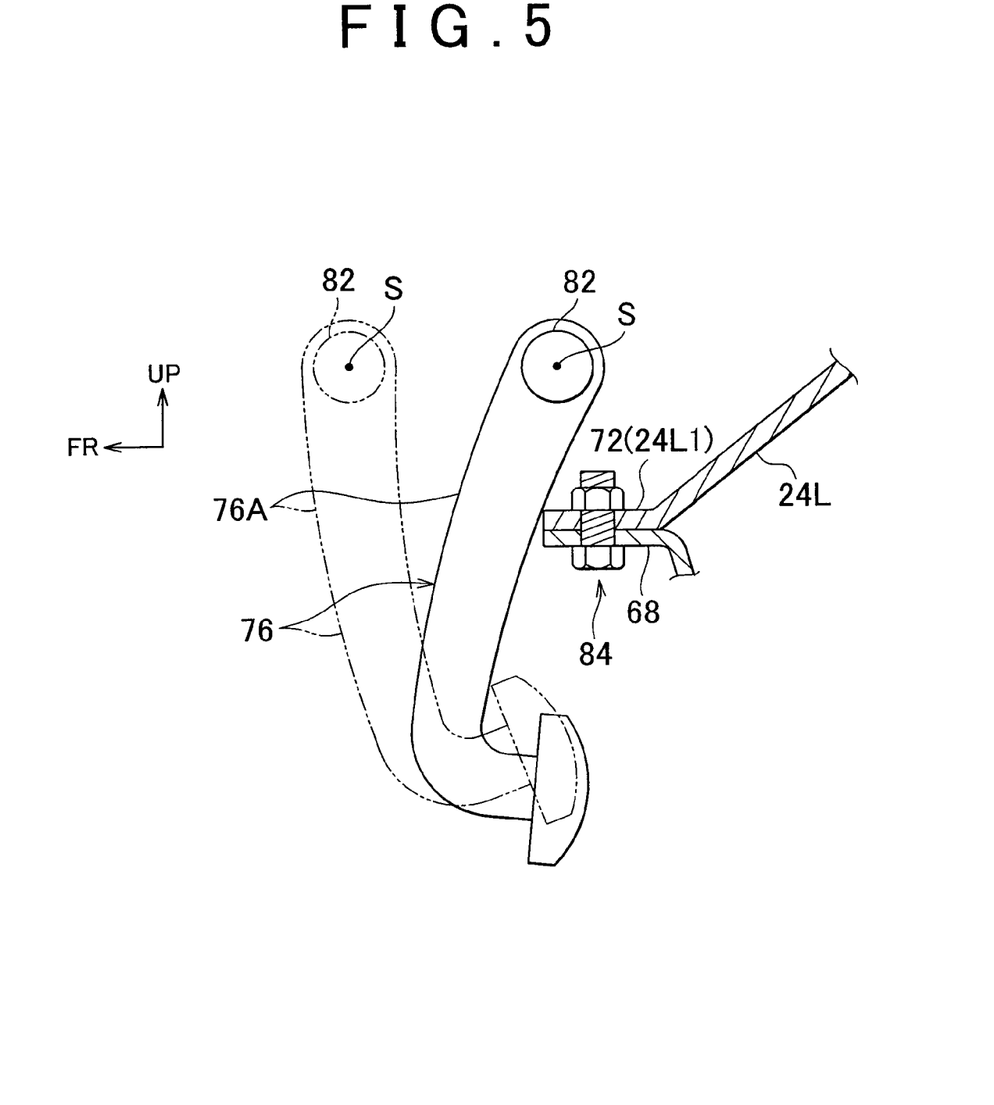
FIG. 5 is a schematic vertical sectional view showing a clutch pedal that has impacted the front end portion of a knee panel, and has pivoted toward the front of the vehicle.
Figure 6:
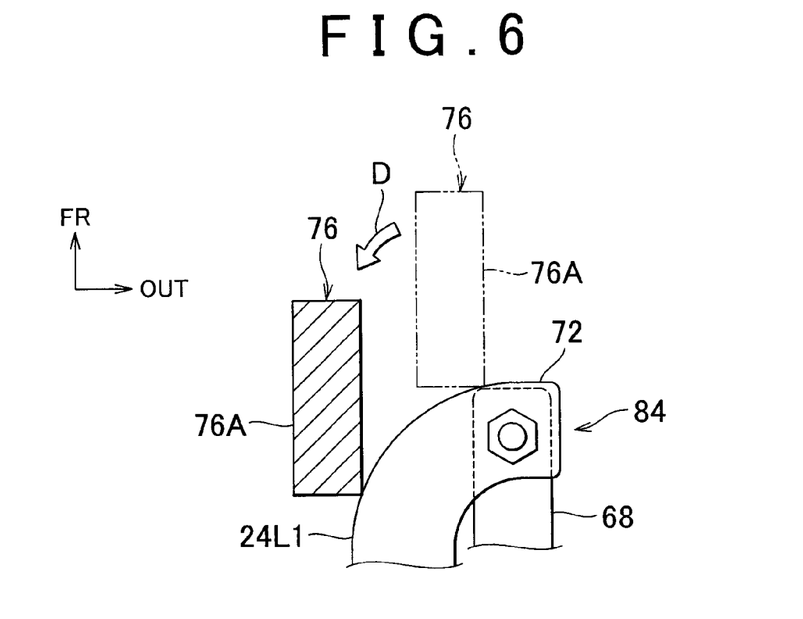
FIG. 6 is an enlarged plan view of a portion of the structure shown in FIG. 4 for describing the clutch pedal when displaced outward in a seat widthwise direction along a curved portion of the knee panel.

Furthermore, in the rearward pedal movement restraint assembly 10, if the clutch pedal 76 moves rearward due to the impact of a frontal collision, the intermediate portion 76A of the clutch pedal 76, below the rotation center S of the pedal, impacts the front end of the knee panel 24L. Therefore, as shown in FIG. 5, the clutch pedal 76 is pivoted toward the front of the vehicle (two-dot chain line in FIG. 5) so that the amount of rearward movement of the pedal is reduced. Thus, even if this structure is applied to a vehicle in which the knee airbag module 50 is mounted high, the amount of rearward movement of the pedal can be reduced by disposing the front end portion of the knee panel 24L substantially at the same height as the intermediate portion 76A of the clutch pedal 76. Moreover, because the knee panel 24L for protecting the occupant's knee portion at the time of a frontal collision of the vehicle is also used as a component in restraining the rearward movement of the pedal, it is possible to avoid increasing the number of component parts, as well as cost and mass.

Besides, in this pedal rearward movement restraint structure 10, the lower end of the lower bracket 22L capable of supporting the reaction force caused by the deployment of the knee airbag 52 is fixed to the front end of the knee panel 24L. The lower bracket 22L is supported by the floor brace 16 via the link bracket 32, and is less easily deformable than the upper brackets 20R and 20L to impact loads in the vehicle longitudinal direction. That is, the lower bracket 22L has greater rigidity than the upper brackets 20R and 20L against impact loads in the vehicle longitudinal direction. Accordingly, the load transmitted (input) from the intermediate portion 76A of the clutch pedal 76 to the front end portion of the knee panel 24L may be supported by the high-rigidity lower bracket 22L. Therefore, rearward movement of the clutch pedal 76 is effectively restrained. In addition, because a construction dedicated to improvement of the rigidity of the front end portion of the knee panel 24L is not necessary, increase in mass can be restrained.

Furthermore, because the fastening-fixing portion 84 between the module case 56 and the knee panel 24L is provided in the front end portion of the knee panel 24L in the pedal rearward movement restraint assembly 10, the rigidity of the front end portion of the knee panel 24L is enhanced. Therefore, it is possible to restrain the deformation of the knee panel 24L when the intermediate portion 76A of the clutch pedal 76 impacts the front end portion of the knee panel 24L, so that it is possible to effectively restrain the rearward movement of the clutch pedal 76. Moreover, as stated in the previous paragraph, because a construction dedicated to improvement of the rigidity of the front end portion of the knee panel 24L is not needed, increase in mass can be restrained.

Besides, in the pedal rearward movement restraint structure 10, the front end portion of the knee panel 24L that contacts the intermediate portion 76A of the clutch pedal 76 is provided as the curved portion 24L1, which is curved toward the middle of the seat in the seat widthwise direction (toward a one-dot chain line X in FIG. 4). Therefore, if the intermediate portion 76A of the clutch pedal 76 moving rearward to the knee panel 24L side deviates from the front end portion (curved portion 24L1) of the knee panel 24L when impacting the front end portion of the knee panel 24L, the intermediate portion 76A of the clutch pedal 76 is displaced outward in the seat widthwise direction along a round shape of the curved portion 24L1 (see an arrow D in FIG. 6). Therefore, approach of the clutch pedal 76 to an occupant can be avoided. Moreover, because the distal end of the curved portion 24L1 is formed along with the vehicle width direction, action of a component force in the vehicle width direction on the clutch pedal 76 may be minimized when the intermediate portion 76A of the clutch pedal 76 properly contacts the distal end of the curved portion 24L1. Thereby facilitating the pivoting of the clutch pedal 76 toward the front of the vehicle.

Although the front end portion of the knee panel 24L includes the curved portion 24L1 in the first embodiment, the invention is not restricted to this construction. For example, a construction in which the front end portion of the knee panel may include an inclined portion that is inclined toward the middle of the seat in the widthwise direction thereof (toward the one-dot chain line X). Likewise, if the intermediate portion of the clutch pedal deviates from the front end of the knee panel when impacting the front end of the knee panel, the intermediate portion of the clutch pedal is displaced outward in the seat widthwise direction, following the incline of the inclined portion.

Although the fastening-fixing portion 84 is provided on the front end portion of the knee panel 24L, between the module case 56 and the knee panel 24L, in the first embodiment, the invention is not restricted to this construction. For example, a construction in which the fastening-fixing portion 84 is omitted (a construction in which only the front end portion of the knee panel 24L contacts the intermediate portion 76A of the clutch pedal 76) may be adopted instead.

Next, other embodiments of the invention will be described. Components having basically the same constructions and operation as those of the first embodiment are denoted using the same reference characters as in the first embodiment, and the descriptions thereof will be omitted.

Figure 7:
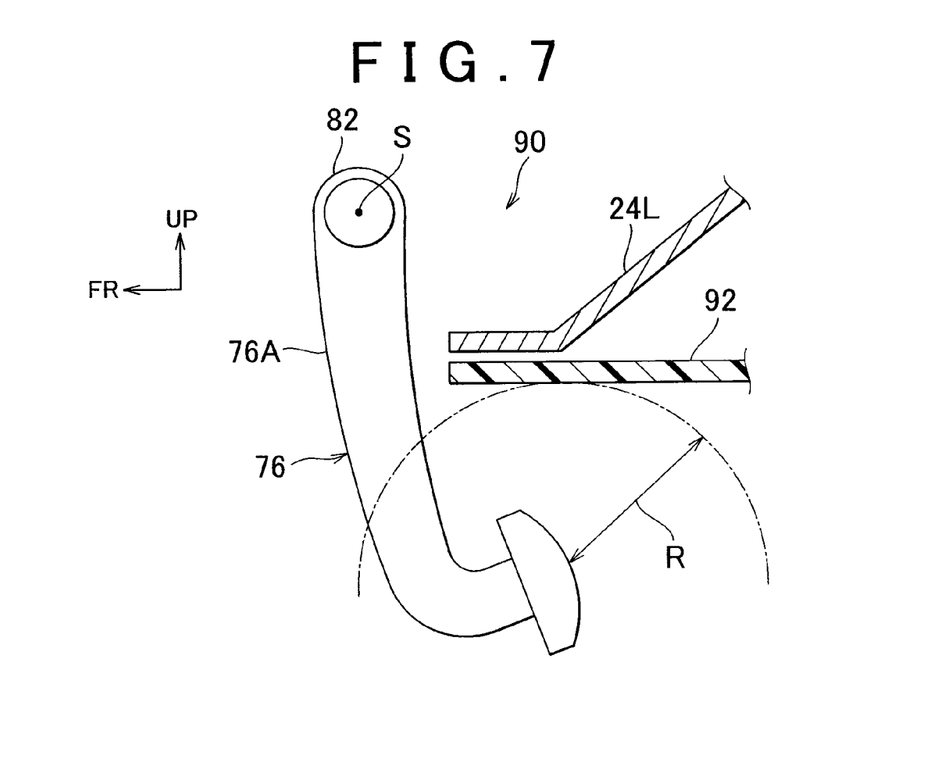
FIG. 7 is a schematic vertical sectional view showing a partial structure of a rearward pedal movement restraint assembly for a vehicle in accordance with a second embodiment of the invention.

FIG. 7 shows a construction of a rearward pedal movement restraint assembly 90 for a vehicle in accordance with a second embodiment of the invention in a schematic vertical sectional view. Although the embodiment is constructed basically in the same manner as the first embodiment, a bottom cover 92 that is a resin-made decorative plate is disposed below the knee panel 24L (in FIG. 7, illustration of the knee airbag module 50 is omitted for convenience in description).

The bottom cover 92 may be fixed to an instrument panel 14 (see FIG. 2 and FIG. 3), and a space for an occupant to operate a clutch pedal 76 (a region of a radius R (of, e.g., 100 mm) about a distal end of the clutch pedal 76 as indicated by a one-dot chain line in FIG. 7) is secured. The front end of the bottom cover 92 is disposed under the front end of a knee panel 24L, and faces the intermediate portion 76A of the clutch pedal 76 from the rear of the vehicle.

In this embodiment, when the clutch pedal 76 moves rearward due to the impact of a frontal collision, the intermediate portion 76A of the clutch pedal 76 impacts the front end of the knee panel 24L and the front end of the bottom cover 92. Therefore, the clutch pedal 76 pivots toward the front of the vehicle, thereby reducing the amount of rearward movement of the pedal. Thus, because the load from the clutch pedal 76 moving rearward is borne not only by the knee panel 24L but also the bottom cover 92, the rearward movement of the clutch pedal 76 is restrained more effectively.

Figure 8:
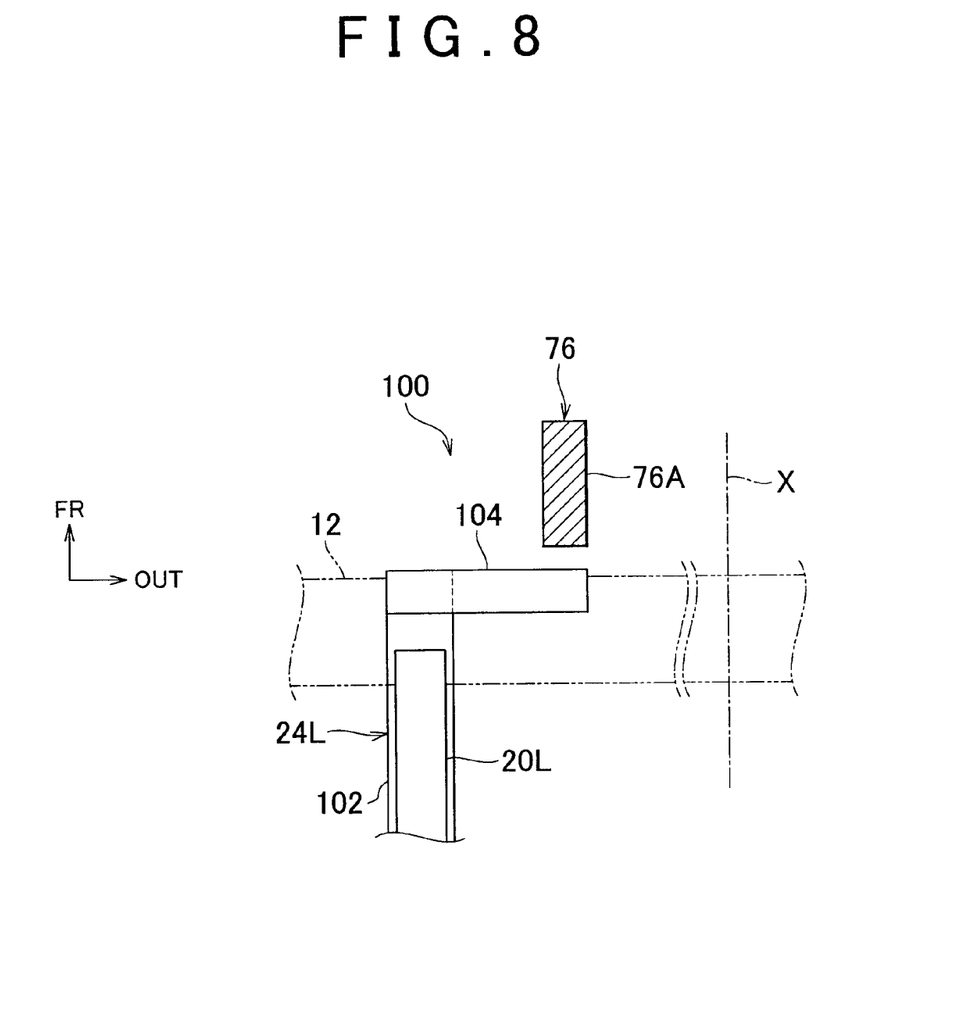
FIG. 8 is a schematic partial plan view showing a partial structure of a rearward pedal movement restraint assembly for a vehicle in accordance with a third embodiment of the invention.

FIG. 8 shows a construction of a rearward pedal movement restraint assembly 100 for a vehicle in accordance with a third embodiment of the invention in a schematic plan view. This embodiment is constructed basically in the same manner as the first embodiment (illustration of the knee airbag module 50 is omitted in FIG. 8 for convenience in description). However, in this embodiment, the knee panel 24L is constructed of a panel body 102, and an extension portion 104 that is welded to the front end portion of the panel body 102, and the curved portion 24L1 employed in the first embodiment is omitted. The panel body 102 is attached to an instrument panel reinforcement 12 via an upper bracket 20L and a lower bracket 22L. The extension portion 104 extends outward in the vehicle transverse direction from the front end portion of the panel body 102 (i.e., extends therefrom toward a one-dot chain line X, that is, toward the middle of a seat in which an occupant sits, in the transverse direction), and the distal end of the extension portion 104 faces the intermediate portion 76A of the clutch pedal 76 from the rear of the vehicle.

In this embodiment, when a frontal collision has occurred, the extension portion 104 of the knee panel 24L impacts the intermediate portion 76A of the clutch pedal 76. Therefore, the clutch pedal 76 is pivoted forward, so that the amount of rearward movement of the clutch pedal 76 is reduced. Thus, because the extension portion 104 extending in the vehicle transverse direction is fixed to the front end of the panel body 102, the rearward movement of the clutch pedal 76 may be favorably restrained by the extension portion 104 even if the panel body 102 becomes separated from the clutch pedal 76 in the vehicle transverse direction.

Figure 9:
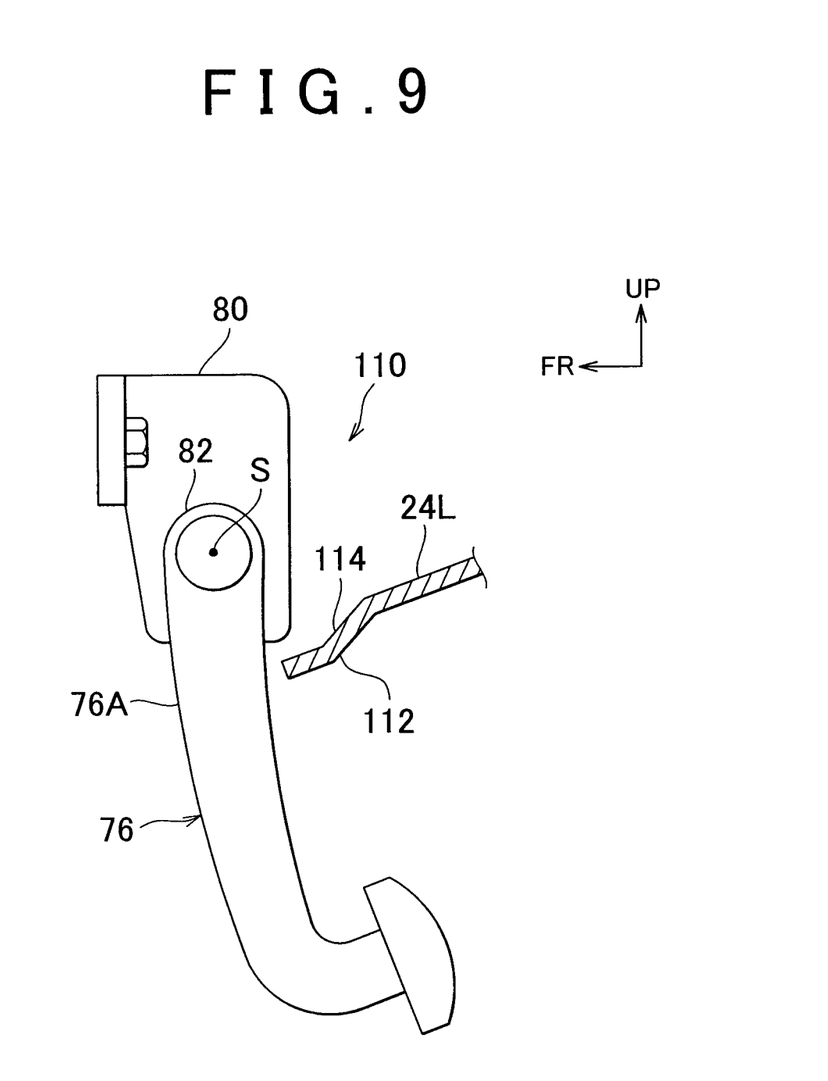
FIG. 9 is a schematic vertical sectional view showing a partial structure of a rearward pedal movement restraint assembly for a vehicle in accordance with a fourth embodiment of the invention.

FIG. 9 shows a rearward pedal movement restraint assembly 110 for a vehicle in accordance with a fourth embodiment of the invention in a schematic vertical sectional view. The configuration of this embodiment is basically the same as that of the first embodiment (illustration of the knee airbag module 50 is omitted in FIG. 9 for convenience in description). However, in the fourth embodiment, the knee panel 24L is disposed at a higher position than in the first embodiment. The front end portion of the knee panel 24L includes an extended portion 112, which extends diagonally downward toward the front of the vehicle, and the distal end of which faces an intermediate portion 76A of the clutch pedal 76, below pedal bracket 80. An inclined surface 114 that forms an upper portion of the extended portion 112 faces the lower end of the pedal bracket 80 from the rear of the vehicle.

In this embodiment, even if the pedal bracket 80 contacts the front end portion (the extended portion 112) of the knee panel 24L at the time of a frontal collision of the vehicle, the clutch pedal 76 will be restrained from moving toward the rear of the vehicle because the distal end of the extended portion 112 impacts the intermediate portion 76A of the clutch pedal 76. Moreover, because the pedal bracket 80 contacts the inclined surface 114 of the extended portion 112, the lower end of the pedal bracket 80 deforms upward due to a reaction force from the inclined surface 114. Therefore, it is possible to restrain the movement toward the rear of the vehicle of not only the clutch pedal 76 but also the pedal bracket 80.

The above-described embodiments are configured so that the sheet thickness of the right lower bracket 22R is thicker than the upper brackets 20R and 20L, and the lower bracket 22R is more rigid than the upper brackets 20R and 20L. However, the invention is not restricted to this configuration. For example, the lower brackets may be made of a material different from that used to make the upper brackets, and thereby the lower bracket is formed so as to have higher rigidity than the upper bracket.

In addition, instead of fixing the left lower bracket 22L to the floor brace 16 via the link bracket 32, the invention may be modified to omit the link bracket 32 and employ a lower bracket that is substantially the same as the lower bracket 22R in place of the lower bracket 22L.

Alternatively, instead of forming the upper brackets 20R and 20L so that they are sharply bended at the first crease 46 and the second crease 48, the mode of deformation of the upper brackets may be changed as appropriate.

Furthermore, although the bracket for attaching the knee panel 24L to the instrument panel reinforcement 12 in the described embodiment is provided with the upper bracket 20L and the lower bracket 22L, the construction of the bracket can be changed as appropriate.

Although the above-described embodiments incorporate the knee airbag module the invention is not is not restricted to such embodiments. Instead, the knee airbag module 50 may be omitted.

Although the invention is applied to restrain the rearward movement of the clutch pedal 76 in the embodiments described above, the invention may also be employed to restrain the rearward movement of other pedals, such as, for example, the parking brake pedal and the like.

Although the embodiments have been described in the context of right-hand drive vehicles, the invention is also applicable to left-handed vehicles.

Furthermore, the invention may be modified in various ways without departing from the scope of the invention. In addition, it is to be understood that the scope of right of the invention is not restricted to the particulars of the described embodiments.

The invention claimed is:

1. A rearward pedal movement restraint assembly for a vehicle, in which a knee panel for protecting a knee of an occupant in the event of a frontal collision of the vehicle is attached to an instrument panel reinforcement via a bracket, and which is configured such that a pedal that moves rearward by an impact of the frontal collision is brought into contact with a front end portion of the knee panel at an intermediate portion of the pedal that is below a rotation center of the pedal so that the pedal pivots toward a front of the vehicle, wherein a knee airbag module is attached to a lower side of the knee panel, the bracket includes an upper bracket that is plastically deformable by a load that is input into the knee panel from the knee of the occupant and a lower bracket that is able to support a reaction force induced by deployment of a knee airbag, and the lower bracket is fixed to a front end side of the knee panel, and each of the front end portion of the knee panel, which is brought into contact with the intermediate portion of the pedal, and an intermediate portion of the knee panel in a vertical direction is provided with a fastening-fixing portion for fastening and fixing the knee airbag module and the knee panel.

2. The rearward pedal movement restraint assembly for a vehicle according to claim 1, wherein the front end portion of the knee panel, which is brought into contact with the intermediate portion of the pedal, s curved or inclined toward a middle of a seat, in which the occupant sits, in a widthwise direction of the seat.

3. The rearward pedal movement restraint assembly for a vehicle according to claim 1, wherein the knee panel includes a panel body that is attached to the instrument panel reinforcement via the bracket, and an extension portion that is fixed to a front end portion of the panel body and that extends from the front end portion of the panel body in a transverse direction of the vehicle, and wherein the intermediate portion of the pedal is disposed at such a position as to contact the extension portion in the event of the frontal collision.

4. The rearward pedal movement restraint assembly for a vehicle according to claim 1, wherein an upper end portion of the pedal is rotatably supported by a pedal bracket that is fixed to a vehicle body, and an extended portion that extends diagonally downward toward the front of the vehicle is provided on the front end portion of the knee panel, a distal end of the extended portion facing, below the pedal bracket, the intermediate portion of the pedal.

5. The rearward pedal movement restraint assembly for a vehicle according to claim 1, wherein a lower end portion of the lower bracket is disposed between the fastening-fixing portion on the front end side of the knee panel and the fastening-fixing portion at the intermediate portion of the knee panel in the vertical direction.

* * * * *